Sept. 6, 1949.  M. E. HATCHER  2,480,855
TIRE PRESSURE INDICATING DEVICE
Filed Jan. 16, 1947  2 Sheets-Sheet 2
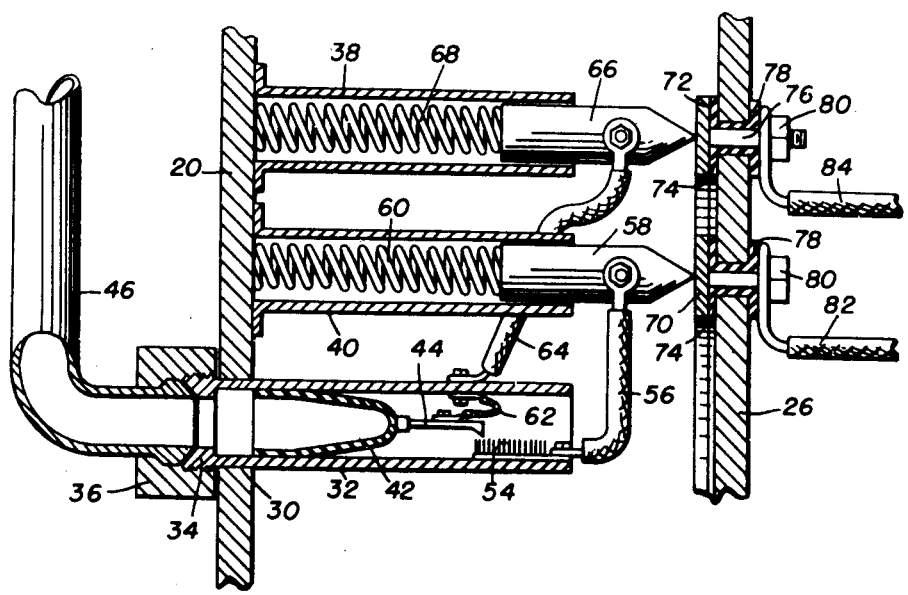
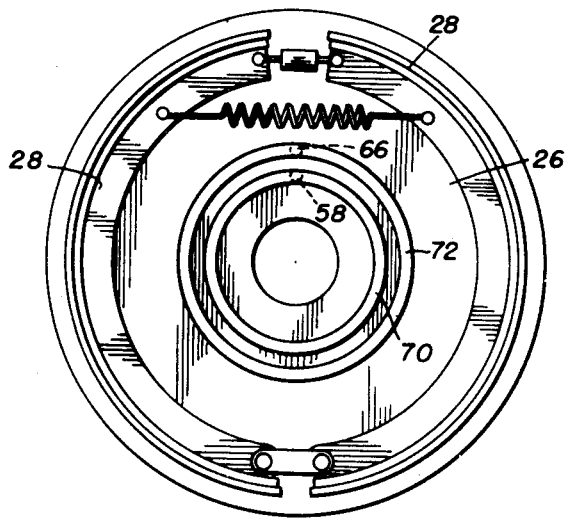
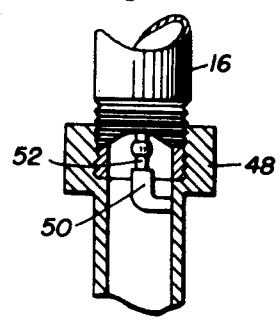
Inventor
Merrel E. Hatcher
By Clarence A. O'Brien
and Harvey B. Jacobson
Attorneys Patented Sept. 6, 1949

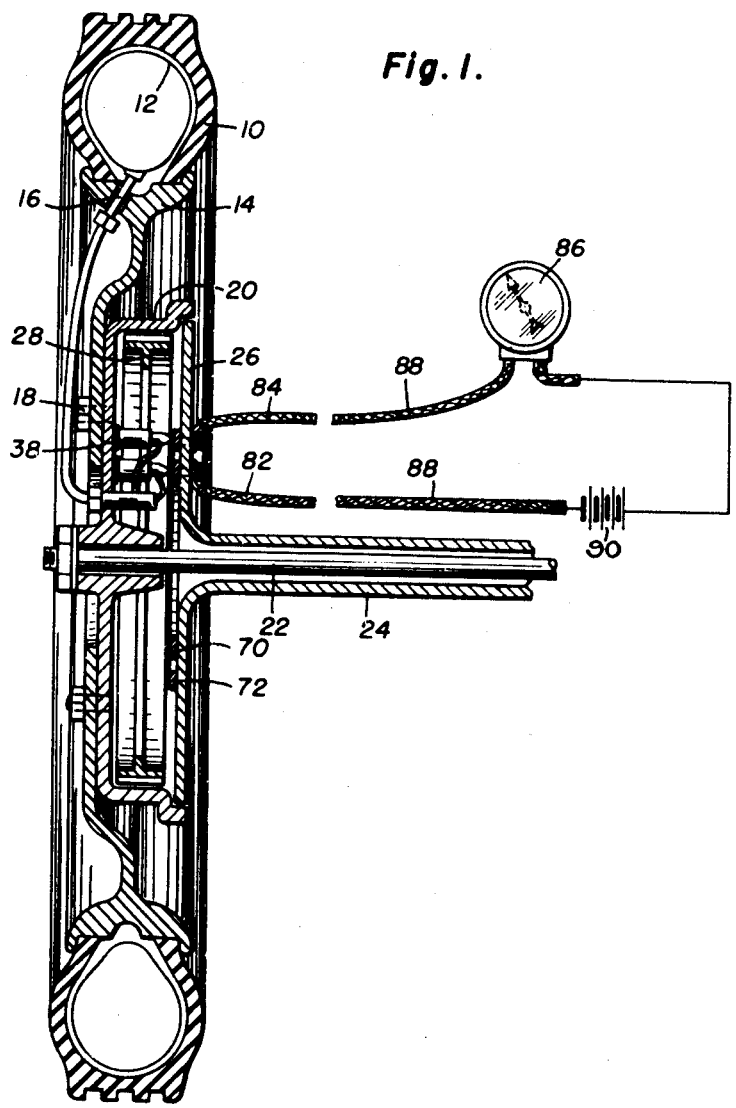

2,480,855

UNITED STATES PATENT OFFICE 2,480,855

TIRE PRESSURE INDICATING DEVICE

Merrel E. Hatcher, Richland, Wash., assignor of ten per cent to Alex Kulick, Richland, Wash.

Application January 16, 1947, Serial No. 722,438

1 Claim. (Cl. 201—48)

This invention comprises novel and useful improvements in a tire pressure indicating device and more specifically pertains to an electrical gauge and system for constantly indicating the extent of inflation or pressure of pneumatic tires for automobiles or airplanes or the like.

The principal purposes of this invention are to provided an indicating device for visually indicating at all times the actual pressure prevailing in pneumatic tires of automobiles or airplanes; in providing a novel and advantageous means for mounting the pressure responsive element of such a device; in providing an improved means for applying the pressure in a tire to the pressure responsive means of the device; in providing a novel and efficient arrangement for electrically indicating at a remote point the pressure prevailing in a tire; in providing an improved switch and rheostat construction for translating the pressure variations into proportionate electrical variations for indicating purposes; in providing a construction which may be conveniently housed in protected relation within the rotating parts of a wheel; in providing an efficient and novel means for electrically connecting the gauge means with the rotating switch means; and in providing a novel arrangement for constantly subjecting the pressure responsive means to the pressure prevailing within a pneumatic tire.

Additional subordinate objects of the invention reside in providing an indicating means of the character above set forth, which shall be of simple, lightweight and inexpensive construction, durable and dependable in operation, quickly attached and readily removed from any conventional type of pneumatic wheel, and which will instantaneously and continuously indicate the pressure conditions within a tire.

These, together with various ancillary objects of the invention which will later become apparent as the following description proceeds, are realized by this invention, one embodiment of which has been illustrated by way of example only, in the accompanying drawings, wherein:

Figure 1 is a vertical sectional view showing conventional construction of vehicle wheel, pneumatic tire, brake drum, axle and axle housing, to which this invention may be applied, the electrical indicating means being diagrammatically indicated;

Figure 2 is an enlarged detail view of a portion of the mechanism shown in Figure 1;

Figure 3 is a plan view illustrating the brake shoe and brake shoe supporting plate of the construction shown in Figure 1, and depicting the position of parts of this invention associated therewith; and Figure 4 is a fragmentary detail view, partly in section and partly in elevation showing the construction of a coupling means of the invention associated with a valve stem of a pneumatic tire.

For convenience of illustration, the device has been shown applied to the construction of a rear wheel of a motor vehicle, although it will be readily understood that the principles of the invention may be readily applied to each of the wheels of a vehicle, to the pneumatic wheels of landing gear of airplanes, and all analogous purposes.

Referring now more specifically to the attached drawings, and in particular to Figure 1, there is indicated at 10 a pneumatic tire having a conventional innertube 12 and shown mounted upon the rim 14 of a wheel, the customary valve stem 16 of the innertube extending through the wheel rim in a manner well known in the art. The rim 14 is shown detachably connected as by bolts or other fastening means 18 to a rotatable brake drum 20 secured upon an axle 22 rotatably journaled in an axle housing 24 in a manner well understood but not shown. Mounted upon the axle housing is a brake shoe carrier plate 26 upon which is supported a known type of expanding brake shoe 28, the arrangement being such that the brake drum 20 encloses the brake shoes and the carrier plate 26.

As shown best in Figure 2, in accordance with the principles of this invention, the wall of the brake drum 20 is apertured as at 30 and extending through this aperture and secured to the brake drum is a preferably tubular casing 32 whose outer extremity is enlarged and screw threaded as at 34 for the reception of a coupling nut 36 for a purpose to be later set forth.

Additional tubular casings 38 and 40 are secured in any suitable manner to the interior wall of the brake drum 20 and are disposed in generally parallel arrangement to the aforementioned casing 32.

Each of the tubular members 32, 38 and 40 are open at their inner end in suitable proximity to the brake shoe carrier plate 26, for a purpose to be later set forth, it being noted as shown in Figure 1, that the tubular casings are all disposed within the confines of the brake drum and the brake shoes.

Suitably secured within the tubular casing 32 is a flexible diaphragm member 42, preferably of a cup-shaped or conical configuration, and provided upon its closed center portion a depending metallic sliding contact member 44. The arrangement is such that the diaphragm member 42 may be expanded and the contact element 44 may be moved longitudinally by the imposition of pressure from the interior of a pneumatic tire to the rear surface of the diaphragm in a manner to be subsequently set forth.

A suitable conduit 46 which may be metallic or flexible as desired, is attached by means of the above mentioned coupling nut 36 to the exterior portion of the tubular casing 32 to the rear of the diaphragm 42, and this conduit is connected as shown in Figures 1 and 4 by means of an internally threaded enlargement 48 on one end thereof which is adapted to be screw threaded upon the valve stem 16. The coupling member 48 of the conduit 46 is provided with an inwardly and axially extending portion 50 which when the coupling member is fully screwed upon the valve stem is adapted to engage and depress to its open position, the stem 52 of the conventional tire valve. It will therefore be seen that as the coupling 48 of the flexible or pneumatic conduit 46 is attached to the valve stem, the valve thereof will be open applying the pressure of the innertube to the interior of the casing 32 and to the rear of the flexible diaphragm 42. It will therefore be seen, that depending upon the degree of inflation existing within the innertube, the diaphragm 42 and the sliding contact member 44 will be positioned at various longitudinal locations within the casing 32.

Secured within the outer end of the tubular casing 32 but insulated therefrom in any suitable manner, is a rheostat 54 of any desired construction, one end of which is connected as by a cable 56 to a brush 58. This brush may conveniently consist of a conical member slidable within the hollow interior of the casing 40 and urged outwardly thereof as by a spring 60. The sliding contact member 44, as shown in Figure 2, is connected by a conductor 62 with a cable 64 establishing electrical contact with a second brush 66 likewise slidable within the hollow interior of the casing 38 and urged outwardly thereof as by a coil spring 68 or the like. As will readily be understood, the tubular casings 38 and 40 will be of insulating material in order to prevent shorting of the electrical circuit therethrough. Since this arrangement is of known construction, illustration of the details thereof would serve no useful purpose and are therefore omitted.

Upon the interior surface of the brake shoe carrier plate 26, are mounted a pair of annular conducting rings 70 and 72 disposed in alignment with the brushes 58 and 66, and insulated as by members 74 from the metallic surface of the carrier plate 26. The annular rings 70 and 72 are provided with terminal posts 76 extending through suitable apertures in the carrier plate 26 and suitably insulated therefrom as by grommets or bushings 78, the threaded extremities of these terminals being engaged by fastening nuts 80 for retaining a pair of electrical cables 82 and 84 thereto. As shown best in Figure 1, an electrical gauge 86, preferably calibrated to read directly in pounds of pressure, is provided with electrical cables 88 extending therefrom. As will be understood, the cables 88, 82 and 84 form parts of an electrical circuit which includes a storage battery or other source of electrical energy 90, and which would necessarily vary with the nature of the vehicle to which the device is applied.

From the foregoing construction it is believed that the operation of the device will be now apparent. Electric current from any suitable source is supplied as by means of the cable 64 to the annular ring 72 and thence by brush 66 and cable 64 to the pressure sliding contact element 44. The latter element is variously adjusted upon the length of the rheostat 54 by means of the diaphragm 42, and thereby provides a variable resistance in the circuit, whereby the current flows by means of cable 56 and brush 58 to the collector ring 70. From thence, the current is conducted by the cable 82 and one of the leads 88 to the indicator 86, and from thence flows by the other conductor 88 to the battery or other source of current not shown.

It will be here appreciated that in response to movement of diaphragm 42 in accordance with variations of pressure within the innertube 12, the contact element 44 varies the effective resistance interposed between the cable 64 and the lead 56. This variable resistance which is directly proportioned to the pressure within the tire effects proportionate calibrated readings on the gauge.

It should be here noted that the movement of the diaphragm 42 and the resistance of the rheostat 54 will be properly calibrated to suit the various situations in which the device is employed. However, the construction is preferably so arranged that the pressure responsive contact member and rheostat together with the brush assembly may conveniently be housed within the brake drum 20 of a motor vehicle or airplane wheel, and in such a use the diaphragm will preferably be capable of a movement of from one-half to one inch longitudinally of the casing 32, while the rheostat will preferably be of about 2000 ohms resistance when used with the customary 6 ohms storage battery of automotive or aeronautical use.

Since various embodiments of the invention will be readily apparent to those skilled in the art, it is not desired to limit the invention to the exact construction shown and described, but all suitable modifications and equivalents may be resorted to falling within the scope of the appended claim.

What I claim is:

A pressure indicator for a vehicle pneumatic tire having a valve and valve stem, a wheel brake drum having an aperture therein and a stationary brake shoe plate, comprising; a tubular casing extending through the aperture provided in said brake drum, a coupling member on said valve stem, a flexible conduit terminally communicating with the bore in said casing and said coupling member, an inwardly axially extending portion in said coupling member to engage and depress said valve to its open position, a pressure responsive diaphragm in the bore of said casing, a sliding contact member secured to said diaphragm, a rheostat in said passage engaging said contact member, a first brush resiliently mounted on said brake drum, a first conductive wire operatively interconnecting said contact member and said first brush, a second brush resiliently mounted on said brake drum, a second conductive wire interconnecting said rheostat and said second brush, conducting rings carried by said stationary brake shoe in contact with said brushes, and further conductive wires extending from said rings and adapted to be secured to a gauge.

MERREL E. HATCHER.

(References on following page)

REFERENCES CITED

The following references are of record in the file of this patent:

UNITED STATES PATENTS

| Number | Name | Date |
|---|---|---|
| 1,908,503 | Behrend et al. | May 9, 1933 |
| 1,921,550 | Swallen | Aug. 8, 1933 |
| 2,071,256 | Dobbs | Feb. 16, 1937 |
| 2,224,798 | Pyatt | Dec. 10, 1940 |
| 2,229,192 | Schultz | Jan. 21, 1941 |
| 2,235,930 | Huggins, Jr. | Mar. 25, 1941 |
| 2,248,047 | Addy et al. | July 8, 1941 |
| 2,355,295 | Holinaty | Aug. 8, 1944 |